US009972259B2

(12) United States Patent
Ouyang et al.

(10) Patent No.: US 9,972,259 B2
(45) Date of Patent: May 15, 2018

(54) ELECTRONIC DISPLAY STRUCTURE FOR ADJUSTING COMMON VOLTAGE

(71) Applicant: HON HAI PRECISION INDUSTRY CO., LTD., New Taipei (TW)

(72) Inventors: Shiang-Ruei Ouyang, New Taipei (TW); Wei-Cheng Chen, Tu-Cheng (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 138 days.

(21) Appl. No.: 14/838,085

(22) Filed: Aug. 27, 2015

(65) Prior Publication Data

US 2016/0351142 A1 Dec. 1, 2016

(30) Foreign Application Priority Data

May 29, 2015 (TW) ............................. 104117351 A

(51) Int. Cl.
*G06F 3/038* (2013.01)
*G09G 5/00* (2006.01)
*G09G 3/36* (2006.01)

(52) U.S. Cl.
CPC ......... *G09G 3/3614* (2013.01); *G09G 3/3688* (2013.01); *G09G 2310/0297* (2013.01)

(58) Field of Classification Search
CPC ............... G09G 3/3614; G09G 3/3688; G09G 2310/0297
See application file for complete search history.

(56) References Cited

U.S. PATENT DOCUMENTS

2005/0140625 A1* 6/2005 Kim ..................... G09G 3/3688 345/89
2005/0195150 A1* 9/2005 Etoh .................... G09G 3/3688 345/100
2007/0024560 A1* 2/2007 Kim ..................... G09G 3/3614 345/94
2007/0085800 A1* 4/2007 Lee ...................... G09G 3/3655 345/94
2009/0167659 A1* 7/2009 Kim ..................... G09G 3/3655 345/89

(Continued)

FOREIGN PATENT DOCUMENTS

TW 200923481 A 6/2009

*Primary Examiner* — Ilana Spar
*Assistant Examiner* — Brent D Castiaux
(74) *Attorney, Agent, or Firm* — ScienBiziP, P.C.

(57) ABSTRACT

An electronic display structure includes a scanning driver circuit for transmitting scan signals to a number of pixel display areas of a display panel, a data driver circuit for transmitting positive and negative display grayscale voltages to the pixel display areas and receiving feedback grayscale voltages corresponding to the display grayscale voltages, a switching circuit for electrically coupling the data driver circuit to or electrically uncoupling the data driver circuit from the pixel display areas, and a common voltage circuit configured to transmit a common voltage to each of the pixel display areas and adjust the common voltage in response to the feedback grayscale voltages. The positive and negative display grayscale voltages and the common voltage cooperatively induce an electric field for driving liquid crystals of a liquid crystal layer to rotate to display images.

14 Claims, 4 Drawing Sheets

(56) References Cited

U.S. PATENT DOCUMENTS

| | | | | |
|---|---|---|---|---|
| 2010/0141163 A1* | 6/2010 | Ye | H05B 33/0818 | 315/189 |
| 2010/0253608 A1* | 10/2010 | Kim | G09G 3/3233 | 345/76 |
| 2011/0205260 A1* | 8/2011 | Weng | G09G 3/3648 | 345/691 |
| 2012/0242641 A1* | 9/2012 | Lee | G09G 3/3655 | 345/212 |
| 2012/0287107 A1* | 11/2012 | Zhao | G09G 3/3655 | 345/212 |
| 2012/0320009 A1* | 12/2012 | Liu | G09G 3/3614 | 345/204 |
| 2013/0106824 A1* | 5/2013 | Yamauchi | G09G 3/3258 | 345/211 |
| 2013/0128170 A1* | 5/2013 | Kwon | G09G 3/3677 | 349/43 |

* cited by examiner

ELECTRONIC DISPLAY STRUCTURE FOR ADJUSTING COMMON VOLTAGE

FIELD

The subject matter herein generally relates to electronic displays, and more particularly to an electronic display structure capable of adjusting a common voltage for rotating liquid crystals of a liquid crystal display.

BACKGROUND

In liquid crystal displays, each pixel contains a pixel electrode and a common electrode. The pixel electrodes receive grayscale voltages, and the common electrodes each receive a common voltage. A positive grayscale voltage is a grayscale voltage that is greater than the common voltage. A negative grayscale voltage is a grayscale voltage that is less than the common voltage. The positive grayscale voltages and the negative grayscale voltages may be both used to reduce strain on liquid crystals of the liquid crystal display from always rotating along a same direction.

BRIEF DESCRIPTION OF THE DRAWINGS

Implementations of the present technology will now be described, by way of example only, with reference to the attached figures.

DETAILED DESCRIPTION

Figure 1:
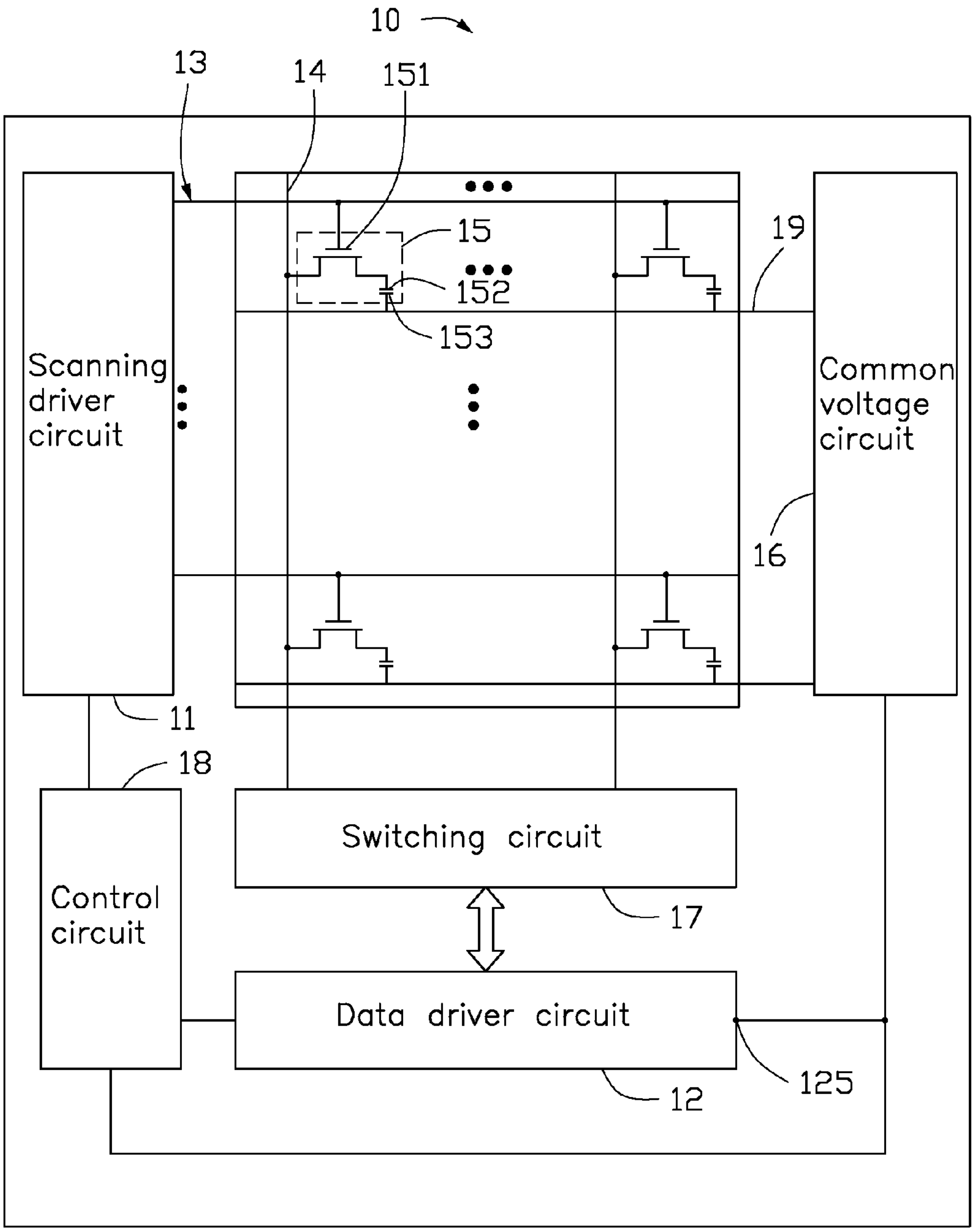
FIG. 1 is a circuit diagram of an embodiment of an electronic display structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like. The term "circuit" is defined as an integrated circuit (IC) with a plurality of electric elements, such as capacitor, resistor, amplifier, and the like.

FIG. 1 illustrates an embodiment of an electronic display structure 10. The electronic display structure 10 can be implemented in an electronic device, such as a liquid crystal display. The electronic display structure 10 can include a plurality of pixel display areas 15, a scanning driver circuit 11, a data driver circuit 12, a switching circuit 17, a common voltage circuit 16, and a control circuit 18. The plurality of pixel display areas 15 can display images thereon. The control circuit 18 can control the scanning driver circuit 11, the data driver circuit 12, and the common voltage circuit 16. The data driver circuit 12 can transmit display grayscale voltages of positive polarity and negative polarity to the plurality of pixel display areas 15. In at least one embodiment, the control circuit 18 is a time controller.

A plurality of scan lines 13 can extend from the scanning driver circuit 11, a plurality of data lines 14 can extend from the data driver circuit 12, and a plurality of common voltage lines 19 can extend from the common voltage circuit 16. A predetermined number of pixel display areas 15 can be arranged along each scan line 13, and scan signals are transmitted from the scanning driver circuit 11 to the plurality of pixel display areas 15 through the plurality of scan lines 13. A predetermined number of pixel display areas 15 can be arranged along each data line 14, and display grayscale voltages are transmitted from the data driver circuit 12 to the plurality of pixel display areas 15 through the plurality of data lines 14. A predetermined number of pixel display areas 15 can be arranged along each common electrode line 19, and a common voltage is transmitted from the common voltage circuit 16 to the plurality of pixel display areas 15 through the plurality of common electrode lines 19. The data driver circuit 12 can be electrically coupled to or electrically decoupled from the plurality of data lines 14 through the switching circuit 17.

Each pixel display area 15 can include a transistor 151, a pixel electrode 152, and a common electrode 153. The scan signals can be of a predetermined voltage level for causing the transistors to be in a conducting state, and the transistors in the conducting state can receive the corresponding grayscale voltages. The pixel electrode 152 can receive the display grayscale voltages from the transistor, and the common electrode 153 can receive the common voltage. The display grayscale voltages and the common voltages of the pixel display areas 15 cooperatively induce an electric field to drive liquid crystals of the liquid crystal display to rotate to display the images. The plurality of pixel display areas 15 can transmit feedback grayscale voltages along the plurality of data lines 14 to the data driver circuit 12.

The data driver circuit 12 can include a feedback terminal 125. The feedback terminal 125 can be electrically coupled to the common voltage circuit 16. The feedback terminal 125 can transmit an average feedback grayscale voltage of the plurality of pixel display areas 15 to the common voltage circuit 16, and the common voltage circuit 16 can adjust the common voltage supplied to the plurality of pixel display areas 15 according to the average feedback grayscale voltage.

Figure 2:
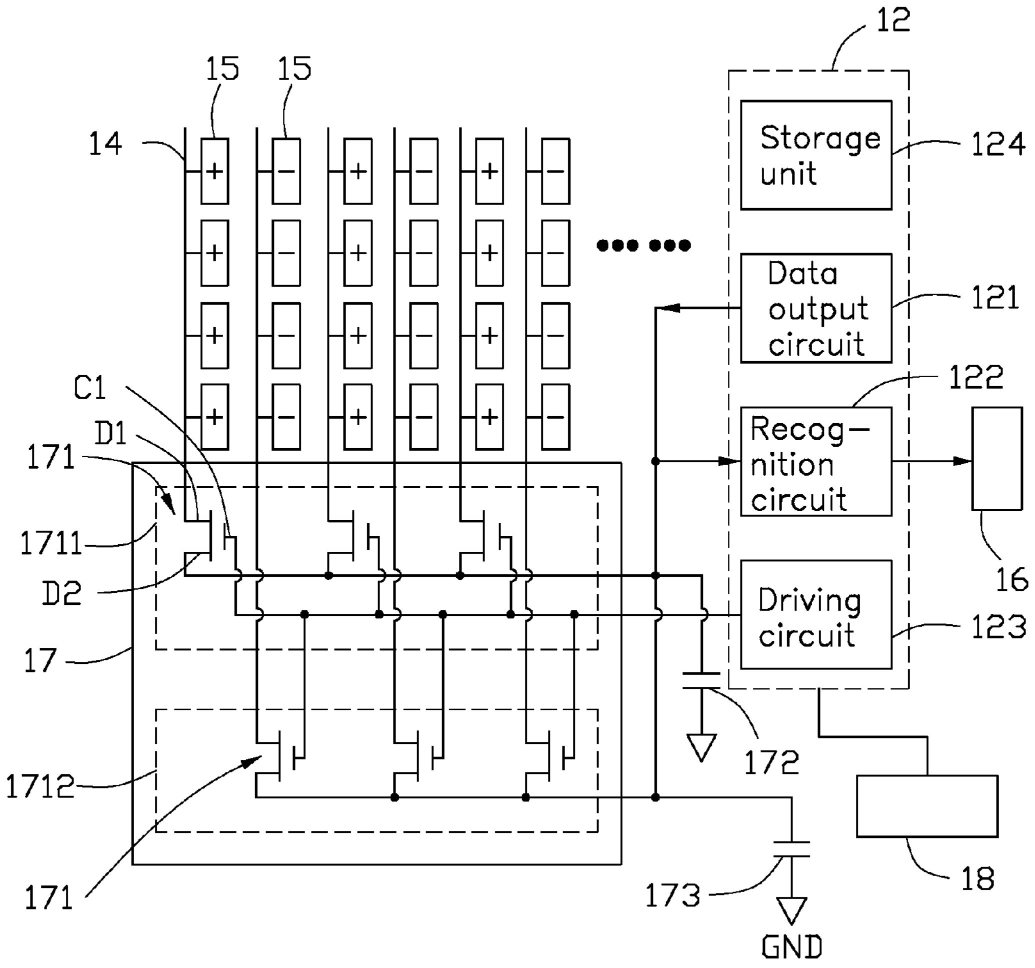
FIG. 2 is a circuit diagram of a first embodiment of a connection relationship between a data driver circuit and a switching circuit of FIG. 1.

FIG. 2 illustrates a first embodiment of a connection relationship between the data driver circuit 12 and the switching circuit 17. The data driver circuit 12 can include a data output circuit 121, a recognition circuit 122, a driving circuit 123, and a storage unit 124. The data driver circuit 12 can receive digital image signals and convert the digital image signals into the display grayscale voltages. The recognition circuit 122 can receive the feedback grayscale voltages from the pixel electrodes 152, calculate the average feedback grayscale voltage, and transmit the average feedback grayscale voltage to the common voltage circuit 16. The driving circuit 123 can control the switching circuit 17 to switch on or switch off to electrically couple to or electrically decouple from the plurality of data lines 14. The storage unit 124 can store the display grayscale voltages and the feedback grayscale voltages.

The switching circuit 17 can include a plurality of switching elements 171. Each switching element 171 can electrically couple the data driver circuit 12 to or electrically decouple the data driver circuit 12 from one corresponding data line 14. Each switching element 171 can include a control terminal C1, a first connecting terminal D1, and a second connecting terminal D2. The control terminal C1 of each switching element 171 can electrically couple to the driving circuit 123. The first connecting terminal D1 of each switching element 171 can electrically couple to the corresponding data line 14. The second connecting terminal D2 of each switching element 171 can electrically couple to the data output circuit 121 and the recognition circuit 122. The control terminal C1, under the control of the driving circuit 123, can cause the first connecting terminal D1 and the second connecting terminal D2 to switch on or switch off to electrically couple the corresponding data lines 14 to the data driver circuit 12 or electrically decouple the corresponding data lines 14 from the data driver circuit 12.

In the first embodiment, the plurality of switching elements 171 can be arranged in two groups, a first group 1711 corresponding to data lines 14 for transmitting positive display grayscale voltages from the data output circuit 121, and a second group 1712 corresponding to data lines 14 for transmitting negative display grayscale voltages from the data output circuit 121. The switching circuit 17 can include a first capacitor 172 and a second capacitor 173. The second connecting terminal D2 of each switching element 171 of the first group 1711 of the switching elements 171 can electrically couple to ground through the first capacitor 172. The second connecting terminal D2 of each switching element 171 of the second group 1712 of the switching elements 171 can electrically couple to ground through the second capacitor 173. The recognition circuit 122 can calculate the average feedback grayscale voltage by calculating an average positive feedback grayscale voltage of the pixel display areas 15 that receive the positive display grayscale voltages, calculating an average negative feedback grayscale voltage of the pixel display areas 15 that receive the negative display grayscale voltages, and calculating the average feedback grayscale voltage from the average positive feedback grayscale voltage and the average negative feedback grayscale voltage. A process of transmitting the positive and negative display grayscale voltages, receiving the positive and negative feedback grayscale voltages, calculating the average feedback grayscale voltage, transmitting the average feedback grayscale voltage to the common voltage circuit 16, and adjusting the common voltage transmitted to the plurality of pixel display areas 15 is repeated.

In at least one embodiment, a process of transmitting the display grayscale voltages to the plurality of pixel display areas 15 can include the following steps:

the scanning driver circuit 11 receives a first control signal from the control circuit 18, the scanning driver circuit 11 transmits the scan signals to gate electrodes of the transistors 151 of the corresponding pixel display areas 15 upon receiving the first control signal, and the transistors 151 of the pixel display areas 15 switch on when the gate electrodes receive the scan signals;

the driving circuit 123 receives the first control signal from the control circuit 18, the driving circuit 123 switches on all of the switching elements 171 upon receiving the first control signal, the data output circuit 121 converts the digital image signals into the positive and negative display grayscale voltages upon the switching elements 171 switching on, and the data output circuit 121 transmits the positive and negative display grayscale voltages along the corresponding data lines 14;

source electrodes of the transistors 151, upon receiving the display grayscale voltages, transmit the display grayscale voltages to corresponding drain electrodes of the transistors 151 and the corresponding pixel electrodes 152; and the common voltage circuit 16 receives the first control signal from the control circuit 18, the common voltage circuit 16 transmits the common voltage to the common electrodes 153 of the pixel display areas 15 upon receiving the first control signal, and the pixel electrodes 152 and the common electrodes 153 cooperatively induce the electric field for driving the liquid crystals of the electronic display structure 10 to rotate to display the image.

In at least one embodiment, a process of receiving the feedback grayscale voltages from the plurality of pixel display areas 15 can include the following steps:

the control circuit 18 transmits a reset signal to the scanning driver circuit 11, the scanning driver circuit 11 stops transmitting the scan signals along the scan lines 13 upon receiving the reset signal, and the transistors 151 switch off upon not receiving the scan signals;

the scanning driver circuit 11 receives a second control signal from the control circuit 18, the scanning driver circuit 11 transmits the scan signals to the gate electrodes of the transistors 151 of the corresponding pixel display areas 15 upon receiving the second control signal, and the transistors 151 of the pixel display areas 15 switch on when the gate electrodes receive the scan signals;

the driving circuit 123 receives the second control signal from the control circuit 18, the driving circuit 123 controls all of the switching elements 171 to switch on upon receiving the second control signal, and the recognition circuit 122 receives the positive and negative feedback grayscale voltages of the corresponding pixel display areas 15 from the plurality of data lines 14;

the recognition circuit 122 calculates the average feedback grayscale voltage of the pixel display areas 15 from the average positive feedback grayscale voltage and the average negative feedback grayscale voltage, and transmits the average feedback grayscale voltage to the common voltage circuit 16; and the common voltage circuit 16, upon receiving the average feedback grayscale voltage, adjusts the common voltage supplied to the common electrodes 153 to match the average feedback grayscale voltage.

In at least one embodiment, the timing of the process of transmitting the display grayscale voltages and the timing of the process of receiving the feedback voltages do not overlap with each other.

Figure 3:
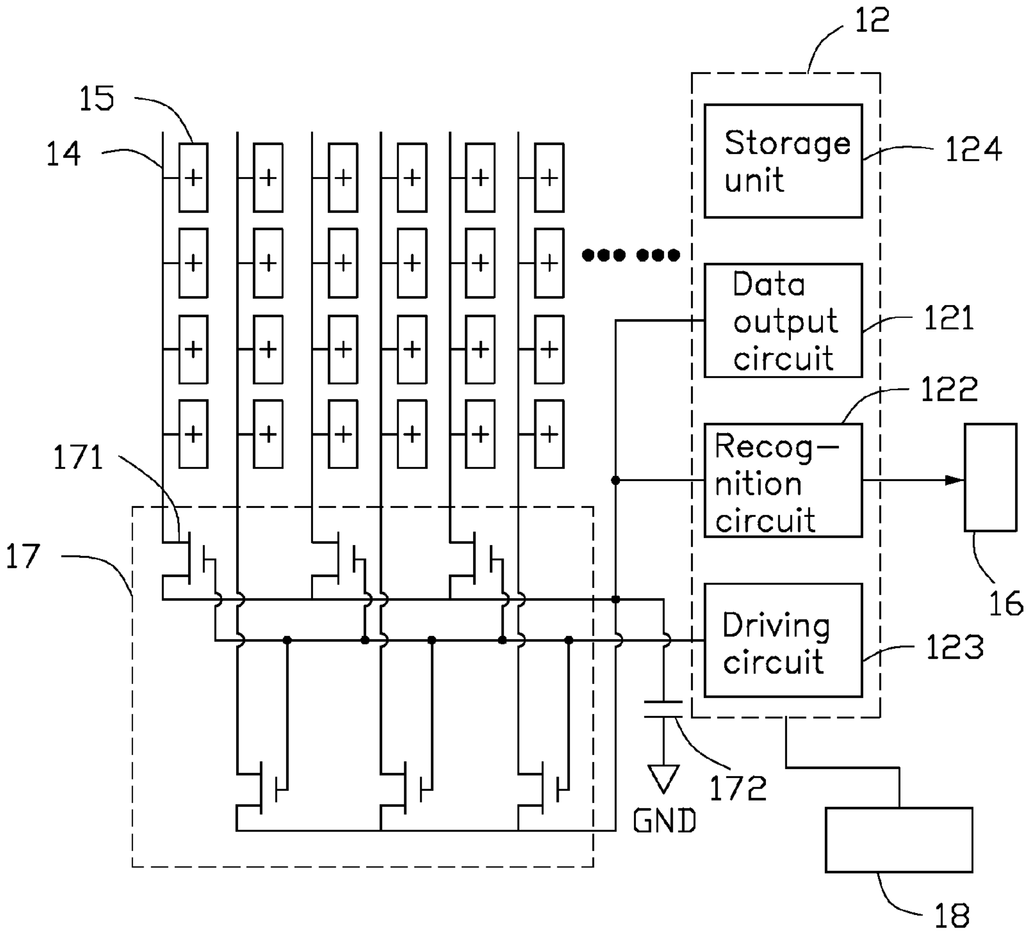
FIG. 3 is a circuit diagram of a second embodiment of a connection relationship between the data driver circuit and the switching circuit of FIG. 1.
Figure 4:
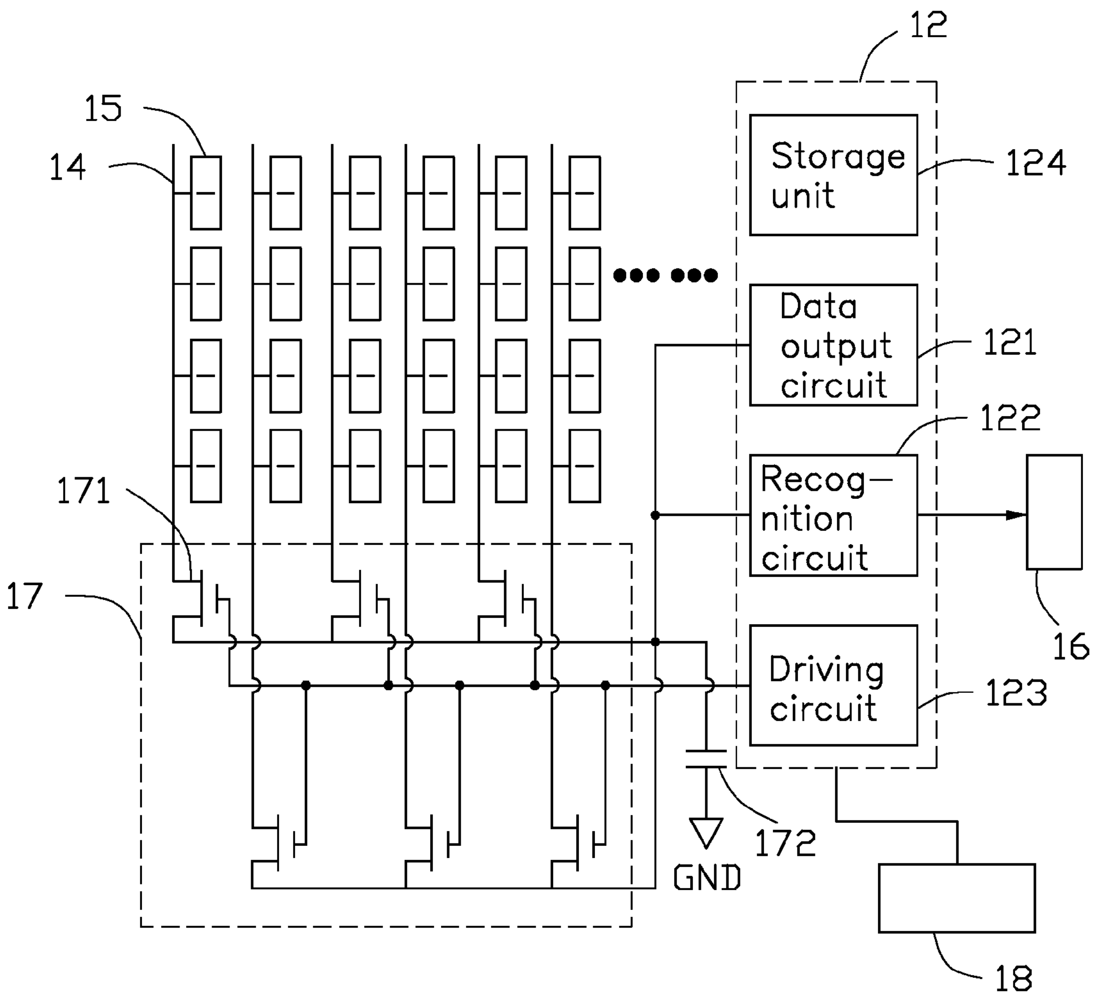
FIG. 4 is similar to FIG. 3, but shows the electronic display structure in another configuration.

FIG. 3 and FIG. 4 illustrate a second embodiment of a connection relationship between the data driver circuit 12 and the switching circuit 17. The second embodiment can be substantially similar to the first embodiment, except that the plurality of switching elements 171 are not arranged in two groups, and the switching circuit 17 does not include the second capacitor 173. Instead, there is only one group of switching elements 171, and the second connecting terminal of each switching element 171 is electrically coupled to ground through the first capacitor 172.

In the second embodiment, the data output circuit 121 alternates transmitting the positive display grayscale voltage and the negative display grayscale voltage. For example, when the data output circuit 121 transmits the positive display grayscale voltages to the pixel display areas 15, the recognition circuit 122 can receive positive feedback grayscale voltages from the pixel display areas 15, and calculate an average positive feedback grayscale voltage of the pixel display areas 15. The average positive feedback grayscale voltage can be stored in the storage unit 124. After calculating the average positive feedback grayscale voltage, the data output circuit 121 can transmit negative display grayscale voltages to the plurality of pixel display areas 15, the recognition circuit 122 can receive negative feedback grayscale voltages from the pixel display areas 15, and the recognition circuit 122 can calculate an average negative feedback grayscale voltage of the pixel display areas 15. The average negative feedback grayscale voltage can be stored in the storage unit 124. The recognition circuit 122 can then calculate the average feedback grayscale voltage from the average positive feedback grayscale voltage and the average negative feedback grayscale voltage. The feedback terminal 125 of the data driver circuit 12 can transmit the average feedback grayscale voltage to the common voltage circuit 16, and the common voltage circuit 16 can adjust the common voltage supplied to the plurality of pixel display areas 15.

A process of transmitting the positive display grayscale voltages, receiving the positive feedback grayscale voltages, calculating the average positive feedback grayscale voltage, transmitting the negative display grayscale voltages, receiving the negative feedback grayscale voltages, calculating the average negative feedback grayscale voltage, calculating the average feedback grayscale voltage, transmitting the average feedback grayscale voltage to the common voltage circuit 16, and adjusting the common voltage transmitted to the plurality of pixel display areas 15 can be repeated.

In at least one embodiment, a process of transmitting either the positive or the negative display grayscale voltages to the plurality of pixel display areas 15 can include the following steps:

the scanning driver circuit 11 receives a first control signal from the control circuit 18, the scanning driver circuit 11 transmits the scan signals to gate electrodes of the transistors 151 of the corresponding pixel display areas 15 upon receiving the first control signal, and the transistors 151 of the pixel display areas 15 switch on when the gate electrodes receive the scan signals;

the driving circuit 123 receives the first control signal from the control circuit 18, the driver circuit switches on all of the switching elements 171 upon receiving the first control signal, the data output circuit 121 converts the digital image signals into the positive or negative display grayscale voltages upon the switching elements 171 switching on, and the data output circuit 121 transmits the positive or negative display grayscale voltages along the corresponding data lines 14;

source electrodes of the transistors 151, upon receiving the positive or negative display grayscale voltages, transmit the positive or negative display grayscale voltages to corresponding drain electrodes of the transistors 151 and the corresponding pixel electrode **152*s* 152; and the common voltage circuit 16 receives the first control signal from the control circuit 18, the common voltage circuit 16 transmits the common voltage to the common electrodes 153 of the pixel display areas 15 upon receiving the first control signal, and the pixel electrode 152*s* 152 and the common electrodes 153 cooperatively induce the electric field for driving the liquid crystals of the electronic display structure 10** to rotate to display the image.

In at least one embodiment, a process of receiving the positive or negative feedback grayscale voltages from the plurality of pixel display areas 15 can include the following steps:

the control circuit 18 transmits a reset signal to the scanning driver circuit 11, the scanning driver circuit 11 stops transmitting the scan signals along the scan lines 13 upon receiving the reset signal, and the transistors 151 switch off upon not receiving the scan signals;

the scanning driver circuit 11 receives a second control signal from the control circuit 18, the scanning driver circuit 11 transmits the scan signals to the gate electrodes of the transistors 151 of the corresponding pixel display areas 15 upon receiving the second control signal, and the transistors 151 of the pixel display areas 15 switch on when the gate electrodes receive the scan signals;

the driver circuit receives the second control signal from the control circuit 18, the driver circuit controls all of the switching elements 171 to switch on upon receiving the second control signal, and the recognition circuit 122 receives the positive or negative feedback grayscale voltages of the corresponding pixel display areas 15 from the plurality of data lines 14;

the recognition circuit 122 calculates the average positive or negative feedback grayscale voltage of the pixel display areas 15, or calculates the average feedback grayscale voltage and transmits the average feedback grayscale voltage to the common voltage circuit 16; and the common voltage circuit 16, upon receiving the average feedback grayscale voltage, adjusts the common voltage supplied to the common electrodes 153 to match the average feedback grayscale voltage.

In at least one embodiment, the timing of the process of transmitting the positive display grayscale voltages, the timing of the process of receiving the positive feedback voltages, the timing of the process of transmitting the negative display grayscale voltages, and the timing of the process of receiving the negative feedback voltages do not overlap with each other.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic display structure comprising:
   - a scanning driver circuit configured to transmit scan signals to a plurality of pixel display areas of a display panel;
   - a data driver circuit configured to transmit display grayscale voltages of different polarities to the plurality of pixel display areas of the display panel and receive feedback grayscale voltages corresponding to the display grayscale voltages;

a switching circuit configured to electrically couple the data driver circuit to the plurality of pixel display areas or electrically uncouple the data driver circuit from the plurality of pixel display areas;

a common voltage circuit configured to transmit a common voltage to each of the plurality of pixel display areas and adjust the common voltage in response to the feedback grayscale voltages; and a control circuit configured to control the scanning driver circuit, the data driver circuit, and the common voltage circuit;

wherein the display grayscale voltages of different polarities and the common voltage cooperatively induce an electric field for driving liquid crystals of a liquid crystal layer to rotate to display images;

the data driver circuit receives feedback grayscale voltages from the pixel display area, and calculates an average feedback grayscale voltage based on the received feedback grayscale voltages; the common voltage circuit adjusts the common voltage supplied to the plurality of pixel display areas to be equal to the average feedback grayscale voltage.

2. The electronic display structure as in claim 1, wherein:

each pixel display area comprises a thin film transistor, a pixel electrode, and a common electrode;

a plurality of scan lines extends from the scanning driver circuit, a predetermined number of pixel display areas is arranged along each scan line, and scan signals are transmitted from the scanning driver circuit to the plurality of pixel display areas through the plurality of scan lines;

a plurality of data lines extends from the data driver circuit, a predetermined number of pixel display areas is arranged along each data line, and the display grayscale voltages are transmitted from the data driver circuit to the plurality of pixel display areas through the plurality of data lines; and a plurality of common electrode lines extends from the common voltage circuit, a predetermined number of pixel display areas is arranged along each common electrode line, and the common voltage is transmitted from the common voltage circuit to the common electrodes of the plurality of pixel display areas through the plurality of common electrode lines.

3. The electronic display structure as in claim 2, wherein:

the data driver circuit comprises a feedback terminal electrically coupled to the common voltage circuit;

the data driver circuit converts digital image signals into the display grayscale voltages, and transmits the display grayscale voltages to the pixel electrodes of the pixel display areas;

the data driver circuit receives the feedback grayscale voltages from the pixel electrodes.

4. The electronic display structure as in claim 3, wherein:

the data driver circuit comprises a data output circuit, a recognition circuit, a driving circuit, and a storage unit;

the data driver circuit is configured to receive the digital image signals and convert the digital image signals into the display grayscale voltages;

the recognition circuit is configured to receive the feedback grayscale voltages from the pixel electrodes, calculate the average feedback grayscale voltage according to the feedback grayscale voltages, and transmit the average feedback grayscale voltage to the common voltage circuit;

the driving circuit is configured to control the switching circuit to switch on or switch off to electrically couple the data driver circuit to or electrically decouple the data driver circuit from the plurality of data lines; and the storage unit is configured to store the display grayscale voltages and the feedback grayscale voltages.

5. The electronic display structure as in claim 4, wherein:

the switching circuit comprises a plurality of switching elements;

the switching elements are configured to electrically couple the plurality of data lines to the data driver circuit or electrically decouple the plurality of data lines from the data driver circuit;

each switching element electrically couples one corresponding data line to the data driver circuit or electrically decouples the one corresponding data line from the data driver circuit;

each switching element comprises a control terminal, a first connecting terminal, and a second connecting terminal;

the control terminal of each switching element electrically couples to the driving circuit of the data driver circuit;

the first connecting terminal of each switching element electrically couples to the corresponding data line;

the second connecting terminal of each switching element is electrically coupled to the data output circuit and the recognition circuit; and the control terminal, under the control of the driving circuit, causes the first connecting terminal and the second connecting terminal to switch on or switch off to electrically coupled the corresponding data lines to the data driver circuit or electrically decouple the corresponding data lines from the data driver circuit.

6. The electronic display structure as in claim 5, wherein a process of transmitting the display grayscale voltages comprises:

the scanning driver circuit receiving a first control signal from the control circuit, the scanning driver circuit transmitting the scan signals to gate electrodes of the transistors of the corresponding pixel display areas upon receiving the first control signal, and the transistors of the pixel display areas switching on when the gate electrodes receive the scan signals;

the driver circuit receiving the first control signal from the control circuit, the driving circuit switching on all of the switching elements upon receiving the first control signal, the data output circuit converting the digital image signals into the display grayscale voltages upon the switching elements switching on, and the data output circuit transmitting the display grayscale voltages along the corresponding data lines;

source electrodes of the transistors, upon receiving the display grayscale voltages, transmitting the display grayscale voltages to corresponding drain electrodes of the transistors and the corresponding pixel electrodes; and the common voltage circuit receiving the first control signal from the control circuit, the common voltage circuit transmitting the common voltage to the common electrodes of the pixel display areas upon receiving the first control signal, and the pixel electrodes and the common electrodes cooperatively inducing an electric field for driving liquid crystals of the electronic display structure to rotate to display the image.

7. The electronic display structure as in claim 6, wherein a process of receiving the feedback grayscale voltages comprises:

the control circuit transmitting a reset signal to the scanning driver circuit, the scanning driver circuit stopping transmitting the scan signals along the scan lines upon receiving the reset signal, and the transistors switching off upon not receiving the scan signals;

the scanning driver circuit receiving a second control signal from the control circuit, the scanning driver circuit transmitting the scan signals to the gate electrodes of the transistors of the corresponding pixel display areas upon receiving the second control signal, and the transistors of the pixel display areas switching on when the gate electrodes receive the scan signals;

the driving circuit receiving the second control signal from the control circuit, the driving circuit controlling all of the switching elements to switch on upon receiving the second control signal, and the recognition circuit receiving the feedback grayscale voltages of the corresponding pixel display areas from the plurality of data lines;

the recognition circuit calculating the average feedback grayscale voltage of the pixel display areas, and transmitting the average feedback grayscale voltage to the common voltage circuit; and the common voltage circuit, upon receiving the average feedback grayscale voltage, adjusting the common voltage supplied to the common electrodes to match the average feedback grayscale voltage.

8. The electronic display structure as in claim 7, wherein:

the plurality of scan lines is divided into a plurality of scanning groups, and the second control signal is transmitted to the plurality of scanning groups one scanning group at a time; and the recognition circuit calculates an average group feedback grayscale voltage of the pixel display areas of each scanning group, calculates the average feedback grayscale voltage of the plurality of scanning groups, and then transmits the average feedback grayscale voltage to the common voltage circuit.

9. The electronic display structure as in claim 7, wherein:

timing of the process of transmitting the display grayscale voltages and timing of the process of receiving the feedback grayscale voltages do not overlap with each other.

10. The electronic display structure as in claim 9, wherein:

the plurality of switching elements is arranged in two groups, a first group corresponding to data lines for transmitting positive display grayscale voltages from the data output circuit, and a second group corresponding to data lines for transmitting negative display grayscale voltages from the data output circuit;

the switching circuit comprises a first capacitor and a second capacitor;

the second connecting terminal of each switching element of the first group of the switching elements is electrically coupled to ground through the first capacitor;

the second connecting terminal of each switching element of the second group of the switching elements is electrically coupled to ground through the second capacitor;

the data output circuit converts the digital image signals into the positive grayscale voltages and the negative grayscale voltages, and outputs the positive grayscale voltages and the negative grayscale voltages to the corresponding data lines;

the recognition circuit calculates the average feedback grayscale voltage by calculating an average positive feedback grayscale voltage of the pixel display areas that received the positive display grayscale voltages, calculating an average negative feedback grayscale voltage of the pixel display areas that received the negative display grayscale voltages, and calculating the average feedback grayscale voltage from the average positive feedback grayscale voltage and the average negative feedback grayscale voltage; and a process of transmitting the positive and negative display grayscale voltages, receiving the positive and negative feedback grayscale voltages, calculating the average feedback grayscale voltage, transmitting the average feedback grayscale voltage to the common voltage circuit, and adjusting the common voltage transmitted to the plurality of pixel display areas is repeated.

11. The electronic display structure as in claim 9, wherein:

the switching circuit comprises a capacitor;

the second connecting terminal of each switching element is electrically coupled to ground through the capacitor;

the data output circuit alternates transmitting positive display grayscale voltages and negative display grayscale voltages to the plurality of data lines;

after transmitting a first one of the positive or negative display grayscale voltages, the recognition circuit receives a corresponding first one of the positive or negative feedback grayscale voltages, calculates a first average feedback grayscale voltage according to the first one of the positive or negative feedback grayscale voltages, and stores the first average feedback grayscale voltage in the storage unit;

after calculating the first average value, the data output circuit transmits a second one of the positive or negative display grayscale voltages, the recognition circuit receives a corresponding second one of the positive or negative feedback grayscale voltages, calculates a second average feedback grayscale voltage according to the second one of the positive or negative feedback grayscale voltages, and stores the second average feedback grayscale voltage in the storage unit;

the recognition circuit calculates the average feedback grayscale voltage by calculating an average of the first average feedback grayscale voltage and the second average feedback grayscale voltage;

the recognition circuit transmits the average feedback grayscale voltage to the common voltage circuit, and the common voltage circuit adjusts the common voltage transmitted to the plurality of pixel display areas according to the average feedback grayscale voltage; and a process of transmitting the first one of the positive or negative display grayscale voltages, receiving the first one of the positive or negative feedback grayscale voltages, calculating the first average feedback grayscale voltage, transmitting the second one of the positive or negative display grayscale voltages, receiving the second one of the positive or negative feedback grayscale voltages, calculating the second average feedback grayscale voltage, calculating the average feedback grayscale voltage, transmitting the average feedback grayscale voltage to the common voltage circuit, and adjusting the common voltage transmitted to the plurality of pixel display areas is repeated.

12. An electronic display structure comprising:

a scanning driver circuit configured to transmit scan signals to a plurality of pixel display areas of a display panel;

a data driver circuit configured to transmit display grayscale voltages of different polarities to the plurality of pixel display areas of the display panel and receive feedback grayscale voltages corresponding to the display grayscale voltages;

a switching circuit configured to electrically couple the data driver circuit to the plurality of pixel display areas or electrically uncouple the data driver circuit from the plurality of pixel display areas;

a common voltage circuit configured to transmit a common voltage to each of the plurality of pixel display areas and adjust the common voltage in response to the feedback grayscale voltages; and a control circuit configured to control the scanning driver circuit, the data driver circuit, and the common voltage circuit;

wherein the display grayscale voltages of different polarities and the common voltage cooperatively induce an electric field for driving liquid crystals of a liquid crystal layer to rotate to display images;

the control circuit sequentially generates a first control signal and a second control signal; the switching circuit establishes an electrical connection between the pixel display area and the data driver circuit based on the first control signal, and the data driver transmits the display grayscale voltages of different polarities to the pixel display area; the switching circuit establishes the electrical connection between the pixel display area and the data driver circuit based on the second control signal, and the data driver receives feedback grayscale voltages from the pixel display area; the data driver circuit converts digital image signals into the display grayscale voltages, transmits the display grayscale voltages to the pixel electrodes of the pixel display area, receives feedback grayscale voltages from the pixel display area, and calculates an average feedback grayscale voltage based on the received feedback grayscale voltages; the common voltage circuit adjusts the common voltage supplied to the plurality of pixel display areas to be equal to the average feedback grayscale voltage.

13. The electronic display structure of claim 12, wherein the switching circuit comprises a plurality of switching elements;

the switching elements are configured to electrically couple the pixel display area to the data driver circuit or electrically decouple the plurality of pixel display area from the data driver circuit;

each switching element electrically couples one corresponding pixel display area to the data driver circuit or electrically decouples the one corresponding pixel display area from the data driver circuit;

each switching element comprises a control terminal, a first connecting terminal, and a second connecting terminal;

the control terminal of each switching element electrically couples to the driving circuit of the data driver circuit;

the first connecting terminal of each switching element electrically couples to the corresponding data line;

the second connecting terminal of each switching element is electrically coupled to the data output circuit and the recognition circuit; and the control terminal, under the control of the driving circuit, causes the first connecting terminal and the second connecting terminal to switch on or switch off to electrically coupled the corresponding data lines to the data driver circuit or electrically decouple the corresponding pixel display area from the data driver circuit.

14. The electronic display structure of claim 12, wherein the control circuit further generates a reset signal; a time of generating the reset signal is between a time of generating the first control signal and a time of generating the second control signal; the switching circuit disconnects the electrical connection between the pixel display area and the data driver circuit based on the reset signal.

* * * * *